Patented Nov. 28, 1933

1,936,716

UNITED STATES PATENT OFFICE 1,936,716

NITROGENOUS VAT DYESTUFFS

Ernst Honold, Frankfort-on-the-Main-Fechenheim, Germany, assignor to General Aniline Works, Inc., New York, N. Y., a corporation of Delaware No Drawing. Application January 30, 1931, Serial No. 512,502, and in Germany February 4, 1930

5 Claims. (Cl. 260—36)

My present invention relates to new nitrogenous vat dyestuffs corresponding probably to the general formula:

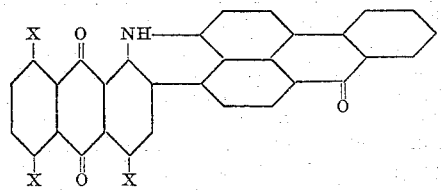

wherein two X's mean hydrogen and one X represents one of the groups NH-alkyl, NH-cycloalkyl, NH-aralkyl, NH-aryl,

and

The new dyestuffs are obtained by treating with an alkaline condensing agent bz.1-benzanthronyl-1-aminoanthraquinone bodies containing in 4-, 5- or 8-position of the anthraquinone nucleus one of the groups signified by one X in the aforesaid general formula.

These starting materials which themselves are scarcely soluble in the vat are obtainable according to the usual methods for instance by condensing bz.1-brombenzanthrone with an 1-aminoanthraquinone body containing in 4-, 5- or 8-position an alkylamino-, cycloalkylamino-, aralkylamino-, arylamino-, dialkylamino- and alkylaralkylamino-group in presence of an acid binding agent and advantageously of a copper compound acting as catalyst.

The new dyestuffs corresponding to the aforesaid general formula are when dry grayish powders soluble in concentrated sulfuric acid with a greenish color and dyeing the vegetable fiber from a bluish to violet to black vat gray shades of a good fastness particularly to light and exposure. By these shades they differ from the dyestuffs of U. S. Patent 995,936 which do not contain a substituted amino-group in the 4-, 5- or 8-position of the anthraquinone nucleus.

It is a remarkable fact that when after treating the present new dyestuffs with an acid condensing agent the solubility of them in the vat is essentially increased whereby the leveling power of the new dyestuffs is favorably influenced. In many cases the aftertreatment involves a change of shade towards brown. The aftertreatment may be effected advantageously by melting aluminium chloride or sodium-aluminium chloride or by acting with strong acids. When acting with sulfuric acid, fuming sulfuric acid or chlorosulfonic acid easily a sulfonation of the dyestuffs occurs. In many cases it is sufficient for this purpose to dissolve the dyestuffs in concentrated sulfuric acid at ordinary temperatures.

In order to further illustrate my invention the following examples are given, the parts being by weight and all temperatures in centigrade degrees, but it is, however, to be understod, that my invention is not limited to the particular products nor reacting conditions mentioned therein:

Example 1

50 parts of bz.1-benzanthronyl-1-amino-5-butylamino-anthraquinone (a non-vattable compound, soluble in concentrated sulfuric acid with a brownish yellow color and obtainable by condensing bz.1-bromobenzanthrone with 1-amino-5-butylamino-anthraquinone) are slowly added to a mixture of 300 parts of caustic potash and 50 parts of alcohol, kept at a temperature of 150–160°. Then the temperature is increased to 180–200° and the reaction mass is diluted with water after about an hour. The dyestuff thus formed is isolated either by blowing in air or by acidification with addition of a small quantity of an oxidant such as hydrogen peroxide. The new dyestuff corresponding probably to the formula:

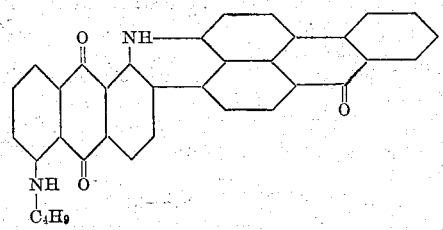

is soluble in concentrated sulfuric acid with a green color and dyes cotton from a violet-blue vat gray-blue shades of a good fastness.

When dissolving the dyestuff in about the tenfold quantity of concentrated sulfuric acid, stirring the green solution for some hours at room temperature and isolating the dyestuff by pouring the solution on ice, the leveling power of the new dyestuff is increased.

The 1-amino-5-butylamino-anthraquinone mentioned above may be obtained by condensing 1-amino-5-chloro-anthraquinone with butylamine at about 180° in the presence of alcohol and sodium acetate. It represents a crystalline red substance, soluble nearly colorless in concentrated sulfuric acid. The latter solution shows a blue coloration after addition of paraformaldehyde.

*Example 2*

50 parts of bz.1-benzanthronyl-1-amino-5-β-ethanol-amino-anthraquinone (a non-vattable body, soluble in concentrated sulfuric acid with a yellowish brown color, turning to blue after addition of paraformaldehyde, which compound is obtainable by acting with bz.1-bromo-benzanthrone on 1-amino-5-β-ethanol-amino-anthraquinone) are subjected to an alkali fusion according to Example 1. The new dyestuff corresponds probably to the formula:

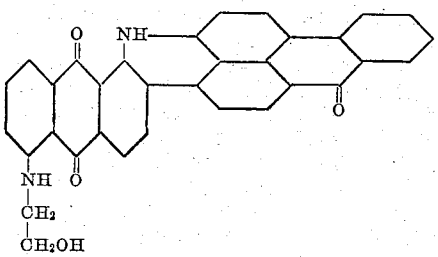

It may be finely divided by grinding it with water and dyes cotton from a violet-blue vat bluish gray fast shades. The dyestuff dissolves in concentrated sulfuric acid with a green color.

The above mentioned 1-amino-5-(β-ethanol-amino)-anthraquinone is unknown hitherto. It may be obtained by condensing 1-amino-5-chloro-anthraquinone with amino-ethanol. The new compound represents a red crystalline substance melting at about 175° and soluble nearly colorless in concentrated sulfuric acid. The latter solution shows a blue coloration after addition of paraformaldehyde.

*Example 3*

When acting with hexahydroaniline on 1-amino-4- and -5- and -8-chloro-anthraquinone respectively the corresponding 1-amino-4-, -5- and -8-hexahydroanilido-anthraquinones are formed, which yield by decomposition with bz.1-bromo-benzanthrone the bz.1-benzanthronyl-1-amino-4-, -5- and -8-hexahydroanilido-anthraquinones, which compounds are non-vattable and are soluble in concentrated sulfuric acid with a blue and yellowish brown color, which latter coloration turns to blue after addition of paraformaldehyde.

When subjecting bz.1-benzanthronyl-1-amino-4-hexa-hydroanilido-anthraquinone to an alkali fusion according to Example 1 a new dyestuff is obtained corresponding probably to the formula:

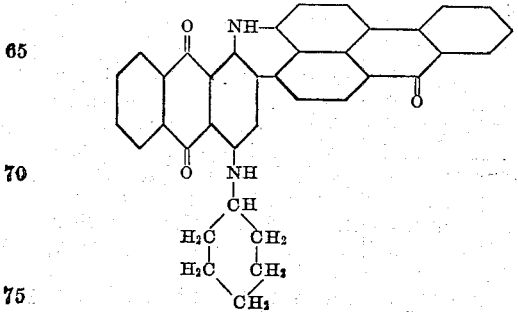

which dyestuff dyes cotton olive-gray shades from a dark violet-black vat.

When subjecting bz.1-benzanthronyl-1-amino-5-hexahydroanilido-anthraquinone to the same alkali fusion a new dyestuff is obtained corresponding to the probable formula:

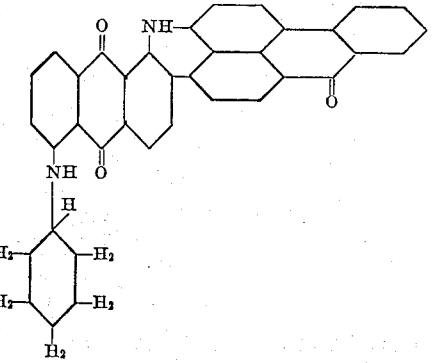

The new dyestuff dissolves in concentrated sulfuric acid with a green color and yields with an alkaline hydrosulfite solution a violet-blue vat from which cotton is dyed fast bluish gray shades. By an aftertreatment with concentrated sulfuric acid as described in Example 1 the leveling power of the dyestuff is increased.

When subjecting bz.1-benzanthronyl-1-amino-8-hexahydroanilido-anthraquinone to an alkali fusion at 180-200° for about 1 hour while using about the fivefold quantity of caustic potash and the same quantity of alcohol a new dyestuff is obtained corresponding to the probable formula:

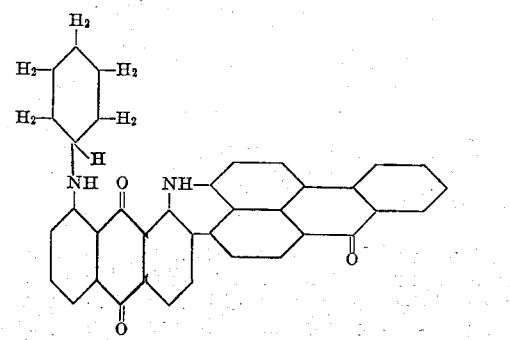

It dissolves in sulfuric acid with a green color and dyes cotton from a dark blue vat greenish gray shades. Its leveling power is increased by an aftertreatment with concentrated sulfuric acid.

*Example 4*

Bz.1-benzanthronyl-1-amino-5-benzylamino-anthraquinone (obtained by condensing bz.1-bromobenzanthrone with 1-amino-5-benzyl-amino-anthraquinone) are subjected to the alkali fusion as described in Example 1. The new dyestuff thus formed corresponds to the probable formula:

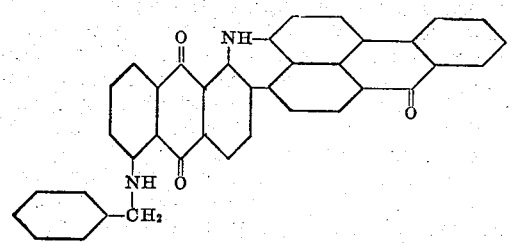

It dissolves in concentrated sulfuric acid with a green color and dyes cotton from a dark violet-blue vat gray shades.

Example 5

50 parts of bz.1-benzanthronyl-1-amino-4-anilido-anthraquinone are slowly added to a mixture of about 300 parts of caustic potash and 50 parts of alcohol, kept at 150–160°. Then the temperature is increased to 180–200° and the reaction mass is diluted with water after about 1 hour. The dyestuff thus formed is isolated by blowing in air and washed out. It corresponds to the probable formula:

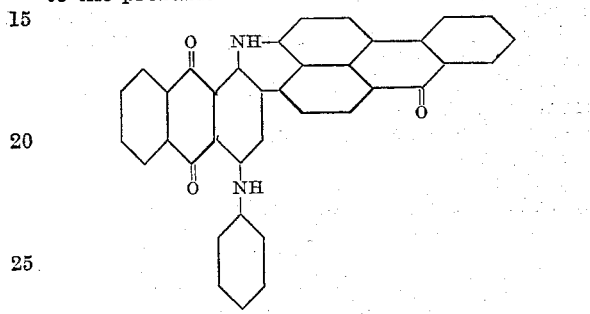

It dissolves in concentrated sulfuric acid with a green color and yields with an alkaline hydrosulfite solution a reddish blue vat, from which cotton is dyed olive gray shades of a good fastness.

In order to carry out an aftertreatment with an acid condensing agent one may introduce slowly 30 parts of the dyestuff into a mixture of 30 parts of sodium chloride and 150 parts of aluminium chloride, kept at about 140°. Then the reaction mass is kept for 2 hours at temperatures from about 150 to 160°, then it is decomposed by adding water and dilute hydrochloric acid whereby the new dyestuff separates. It dyes cotton from a violet-black vat brown shades of a particular fastness to light. It dissolves in concentrated sulfuric acid with a brownish black color.

The aforesaid bz.1-benzanthronyl-1-amino-4-anilido-anthraquinone used as starting material is obtainable by condensing bz. 1-bromo-benzanthrone with 1-amino-4-anilido-anthraquinone with addition of nitrobenzene.

Example 6

Bz.1-benzanthronyl-1-amino-5-paratolylamino-anthraquinone, which represents a non-vattable substance, soluble in concentrated sulfuric acid with a brownish yellow color and obtainable by condensing bz.1-bromo-benzanthrone with 1-amino-5-paratolylamino-anthraquinone, yields when subjected to the caustic alkali fusion a new dyestuff corresponding probably to the formula:

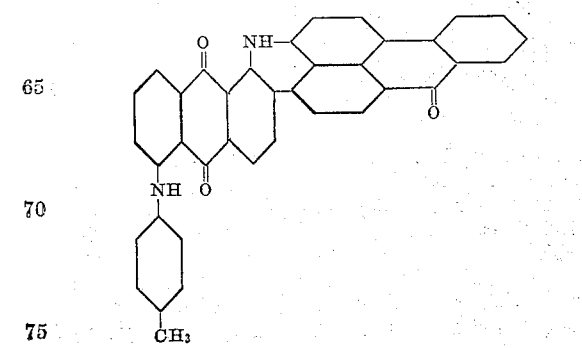

It dissolves in concentrated sulfuric acid with a green color and dyes cotton from a violet-blue vat grayish blue shades of a good fastness.

Example 7

67 parts of bz.1-benzanthronyl-5-amino-1.1'-di-anthrimide are slowly added at about 160–170° to a mixture of 400 parts of caustic potash and 200 parts of alcohol. Then the reaction temperature is increased to about 180–200° and the mass is kept for some hours at this temperature. Then it is diluted with water and the formed dyestuff is isolated by blowing in air or by acidification with addition of a mild oxidant such as hydrogen peroxide.

The new dyestuff corresponds probably to the formula:

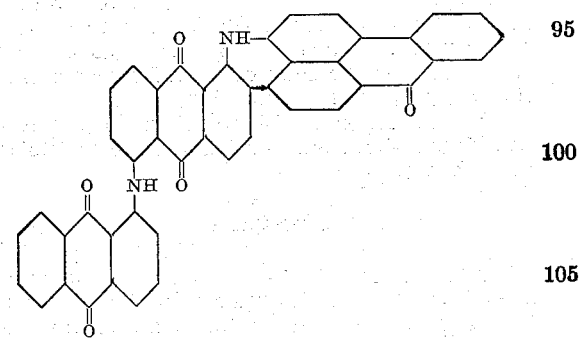

It dissolves in concentrated sulfuric acid with a yellowish green color immediately turning to bluish green. It forms with an alkaline hydrosulfite solution a black-violet vat from which cotton is dyed pure gray shades of a particular fastness to light and exposure.

The bz.1 - benzanthronyl-5-amino - 1.1'-dianthrimide used as starting material may be prepared by a subsequent condensation of 1.5-diamino-anthraquinone with one molecular proportion of bz.1-bromo-benzanthrone and of 1-chloro-anthraquinone. The condensation product dissolves in concentrated sulfuric acid with a yellowish brown color and is a feeble vat dyestuff valueless per se.

When 50 parts of the aforesaid dyestuff are dissolved at 10 to 20° in about 200 parts of chlorosulfonic acid and the bluish green solution thus formed is slowly added to about 400 parts of concentrated sulfuric acid by adding ice-water to the solution a dyestuff is isolated which dyes cotton from a dark bluish black vat bluish gray shades of a good fastness.

When introducing 1 part of the aforesaid dyestuff at 140–150° into a mixture of 1 part of sodium chloride and 5 parts of aluminium chloride and keeping the mixture for some hours at about 170° a dyestuff is formed which may be isolated in the usual manner and may be advantageously finely divided by redissolving it in concentrated sulfuric acid and precipitating it with ice-water. It dyes cotton from a bluish vat fast olive shades.

Example 8

67 parts of bz.1-benzanthronyl-5-amino-1.2'-dianthrimide, obtainable by a subsequent condensation of 1.5-diamino-anthraquinone with one molecular proportion of bz.1-bromo-benzanthrone and of 2-chloro-anthraquinone, are subjected to a caustic alkali fusion using a mixture of 400 parts of caustic potash and 200 parts of alcohol at temperatures ranging from about 160–200°. The dyestuff thus formed corresponds to the probable formula:

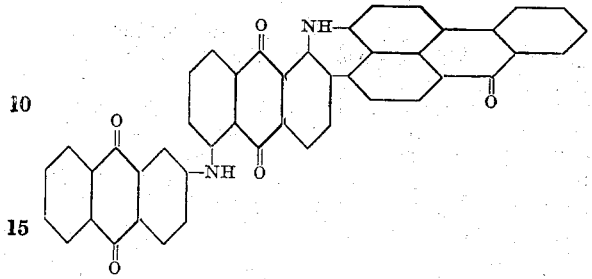

It dissolves in concentrated sulfuric acid with a yellowish green color slowly turning to a more bluish green. It dyes cotton from a dark violet vat reddish gray shades of a good fastness particularly to light and exposure.

When aftertreated with an acid agent the dyestuff dyes cotton from a dark blue vat more bluish gray shades.

Example 9

When subjecting bz.1-benzanthronyl-5-amino-5'-hydroxy-1.1'-dianthrimide to a caustic alkali fusion as described in the foregoing examples a new dyestuff is formed corresponding to the probable formula:

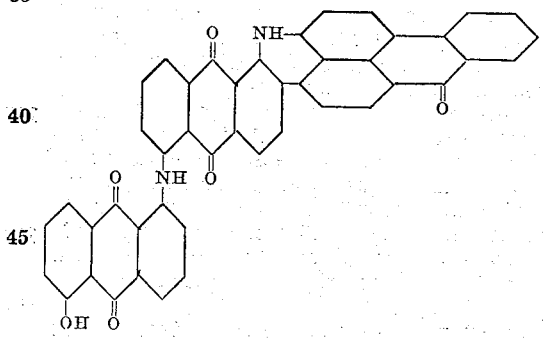

It forms with an alkaline hydrosulfite solution a nearly black vat and dyes cotton therefrom reddish grayish black shades.

The aforesaid initial product may be prepared by condensing bz.1-bromo-benzanthrone with 5-amino-5'-hydroxy-1.1'-dianthrimide. The bz.1-benzanthronyl - 5 - amino-5'-hydroxy-1.1'- dianthrimide thus formed dissolves in concentrated sulfuric acid with a yellowish brown color and dyes cotton valueless shades from a brown vat.

When subjecting bz.1-benzanthronyl-4- and -8-amino-1.1'- and -1.2'-dianthrimide to a caustic alkali fusion dyestuffs of very similar properties are obtained.

Example 10

50 parts of bz.1-benzanthronyl-1-amino-5-dimethyl-amino-anthraquinone, obtained by condensing bz.1-bromo-benzanthrone with 1-amino-5-dimethyl-amino-anthraquinone, are added at about 150–160° to a mixture of 300 parts of caustic potash and 50 parts of alcohol and the reaction mass is kept for some hours at about 180–200°. The dyestuff thus formed is isolated as described in the foregoing examples. It corresponds to the probable formula:

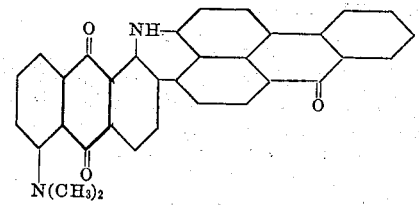

It dissolves in concentrated sulfuric acid with a green color and dyes cotton from a bluish violet vat grayish blue shades of a good fastness. The leveling power is increased by an aftertreatment with concentrated sulfuric acid in a manner as described in the foregoing examples.

Similar dyestuffs are obtained when starting from bz.1 - benzanthronyl - 1 - amino-5-diethyl- and -5-ethylbenzyl-amino-anthraquinone.

I claim:—

1. As new compounds the vat dyestuffs corresponding probably to the general formula:

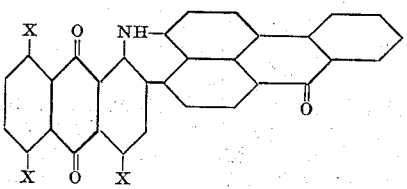

wherein two X's mean hydrogen and one X represents one of the groups NH-$C_nH_{2n}$X, wherein X means H or OH and $n$ the number 1 to 4, NH-hexahydrophenyl, NH- benzyl, NH-aryl the arylradical belonging to the benzene or anthraquinone series,

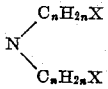

and

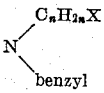

X and $n$ having in both occurrences the aforesaid signification, which dyestuffs are when dry grayish powders, soluble in concentrated sulfuric acid with a greenish color and dyeing the vegetable fiber from a bluish to violet to black vat gray shades of a good fastness particularly to light and exposure, which dyestuffs exhibit an increased solubility in the vat and in consequence thereof an increased leveling power when aftertreated with an acid condensing agent.

2. As new compounds the vat dyestuffs corresponding probably to the general formula:

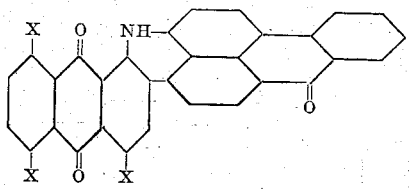

wherein two X's mean hydrogen and one X represents an NH-aryl-group, the aryl radical belonging to the benzene or anthraquinone series, which dyestuffs are when dry grayish powders, soluble in concentrated sulfuric acid with a greenish color and dyeing the vegetable fiber from a bluish to violet to black vat gray shades of a good fastness particularly to light and exposure, which dyestuffs exhibit an increased solubility in the vat and in consequence thereof an increased leveling power when aftertreated with an acid condensing agent.

3. As a new compound the vat dyestuff corresponding probably to the formula:

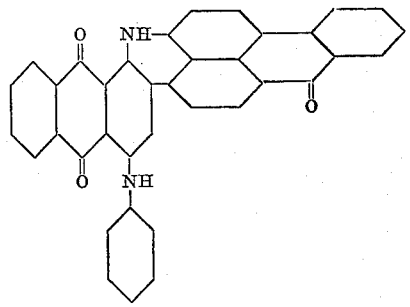

which dyestuff dissolves in concentrated sulfuric acid with a green color and dyes cotton from a reddish blue vat fast olive-gray shades, which dyestuff when aftertreated with melting sodium aluminium-chloride dissolves in concentrated sulfuric acid with a brownish black color and dyes cotton from a violet black vat brown shades of a remarkable fastness to light.

4. As a new compound the vat dyestuff corresponding probably to the formula:

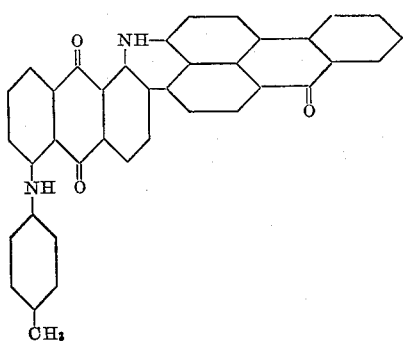

which dyestuff dissolves in concentrated sulfuric acid with a green color and dyes cotton from a violet-blue vat grayish blue shades.

5. As a new compound the vat dyestuff corresponding probably to the formula:

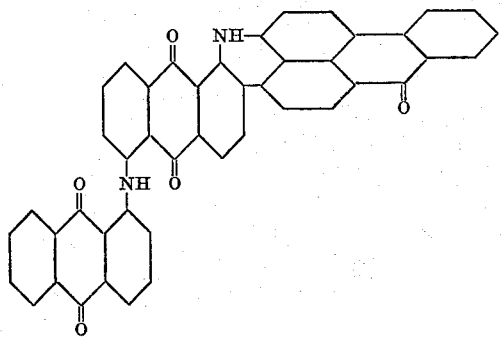

which dyestuff dissolves in concentrated sulfuric acid with a green color and dyes cotton from a black-violet vat pure gray shades of a remarkable fastness to light and exposure, which dyestuff dyes cotton bluish gray shades from a dark bluish black vat when aftertreated with chlorosulfonic acid and concentrated sulfuric acid, which dyestuff dyes cotton olive shades from a black vat when aftertreated with melting sodium aluminium-chloride.

ERNST HONOLD.